B. G. Martin,

Ice Cream Freezer.

No. 4,177. Reissued Nov. 15. 1870.

Witnesses:

Uriah Welch

E. R. Brown

Inventor

B. G. Martin, by J. E. Sheaker

Attorney.

N. PETERS, PHOTO-LITHOGRAPHER, WASHINGTON, D. C.

United States Patent Office.

BENJAMIN GREEN MARTIN, OF WILLIAMSBURG, NEW YORK.

Letters Patent No. 100,305, dated March 1, 1870; antedated February 14, 1870; reissue No. 4,177, dated November 15, 1870.

IMPROVEMENT IN ICE-CREAM FREEZERS.

The Schedule referred to in these Letters Patent and making part of the same.

*To all whom it may concern:*

Be it known that I, BENJAMIN GREEN MARTIN, of Williamsburg, in the county of Kings and State of New York, have invented a new and useful Improved Ice-cream Freezer; and I do hereby declare that the following is a full, clear, and exact description thereof, sufficient to enable those skilled in the art to which my invention appertains to make and use the same, reference being had to the accompanying drawing making part of this specification and to the letters and figures marked thereon.

My invention relates to an improved ice-cream freezer, which may also be used as a churn for making butter; and It consists in suspending said vessel or churn from a rotating shaft, so constructed as to be capable of vertical adjustment; also, so constructing the stirrer or dasher that it will readily adjust itself to freezing-vessels or churns of different sizes.

In the drawing—

Figure 1:
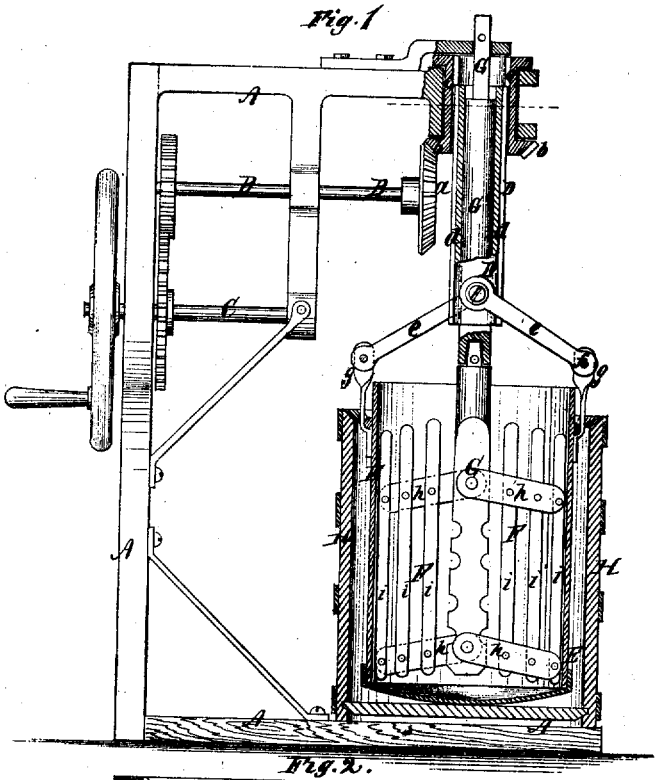
Figure 1 is a side elevation, partly in section.
Figure 2:
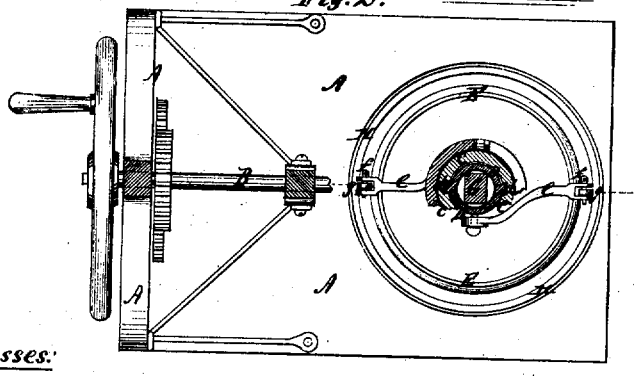
Figure 2 is a plan or top view, partly in section.

In the frame A are located the bearings of a horizontal driving-shaft, B, which carries a pinion, *a*, that meshes into another pinion, *b*, as shown in fig. 1. The pinion *b* has a hollow shank, *c*, which is hung vertically in the upper part of the frame.

The shaft B may receive its motion either directly or through another shaft, C, both shafts being provided with suitable gearing.

D is a hollow vertical shaft, formed with a groove or feather, *d*, and having its upper end fitted into the pinion *b*, and its shank so that it can slide up and down therein and revolve therewith.

To the lower part of the shaft D two arms, *e e*, are pivoted, having their lower ends connected by pins *f*, with lugs *g*, which project from the freezing-vessel or churn E.

The arms *e e* can be spread or contracted, to hold larger or smaller vessels, and the shaft D will adjust itself to vessels of suitable height.

When the shaft B is revolved it will turn the shaft D, and with it the vessel E.

The stirrer or dasher F is fastened to a vertical shaft, G, which is fitted through the hollow shaft D, as shown.

The stirrer consists of two or more sections. Each section is made of two or more horizontal braces *h h*, and a suitable number of vertical bars *i i*.

The braces *h* are pivoted to the shaft G or to a lower extension of the same, and the bars *i* are pivoted to the braces, as shown, thus forming a flexible stirrer or dasher, which can be made narrow for small and wide for large vessels.

When pressed upon the bottom of the vessel E, the outermost bars *i* will be raised, and will thereby bring the bars *h* nearer to a horizontal position, so as to carry the outer bars *i* against the side of the vessel. Such outer bars will then serve as scrapers, to work against the side of the vessel.

The shaft G may be left entirely stationary while the shaft D is rotated with the vessel E, or it may, by carrying a pinion, be revolved in the opposite direction to the shaft D, whereby quicker action will be obtained.

A stationary vessel, H, contains the rotating vessel E, to hold the ice or other freezing-matter.

Having thus described my invention,

What I claim as new, and desire to secure by Letters Patent, is—

1. The up-and-down adjustable rotating-shaft D, combined with the pivoted arms *e e*, to support the rotating vessel E, substantially as herein shown and described.

2. The stirrer F, consisting of the pivoted arms *h* and vertical bars *i*, and made self-adjusting, substantially as herein shown and described.

3. In an ice-cream freezer, the adjustable vertical hollow shaft D, in combination with the vessel E, all substantially as and for the purpose specified.

4. In an ice-cream freezer, the shaft G, working inside the hollow shaft D, in combination with the dashers F, substantially as shown and described.

B. G. MARTIN.

Witnesses:

E. R. BROWN,

T. C. THEAKER.